United States Patent
Taherzadeh Boroujeni et al.

(10) Patent No.: US 11,419,155 B2
(45) Date of Patent: Aug. 16, 2022

(54) MESSAGE 2 PDSCH REPETITION BASED ON MULTI-SEGMENT RAR WINDOW

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/107,626

(22) Filed: Nov. 30, 2020

(65) Prior Publication Data

US 2021/0195652 A1 Jun. 24, 2021

Related U.S. Application Data

(60) Provisional application No. 62/952,001, filed on Dec. 20, 2019.

(51) Int. Cl.
 *H04W 74/08* (2009.01)
 *H04W 76/27* (2018.01)

(52) U.S. Cl.
 CPC ....... *H04W 74/0833* (2013.01); *H04W 76/27* (2018.02)

(58) Field of Classification Search
 None
 See application file for complete search history.

(56) References Cited

U.S. PATENT DOCUMENTS

2011/0237265 A1* 9/2011 Sugawara ........... H04W 74/008
 455/450
2015/0016312 A1* 1/2015 Li ....................... H04W 74/006
 370/280

(Continued)

FOREIGN PATENT DOCUMENTS

WO 2016025899 A1 2/2016
WO 2017184460 A1 10/2017
WO WO-2019076443 A1 * 4/2019 .............. H04W 4/70

OTHER PUBLICATIONS

Intel Corporation: "Further Details on Random Access Procedure for MTC", 3GPP TSG RAN WG1 Meeting #82bis, 3GPP Draft; R1-155303—Intel MTC RA, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015 (Oct. 4, 2015), pp. 1-8, XP051002245, Retrieved from the Internet: URL: http://www.3gpp.org/ftp/Meetings_3GPP_SYNC/RAN1/Docs/ [retrieved on Oct. 4, 2015] Chapter 3. "Scheduling and transmission of RAR"—Chapter 5. "Indication of Repetition Levels for RAR and Message 3".

(Continued)

*Primary Examiner* — Jamaal Henson
(74) *Attorney, Agent, or Firm* — ArentFox Schiff LLP

(57) ABSTRACT

Aspects are provided which improve RAR coverage through RAR PDSCH repetition. A UE is configured to transmit, to a BS, a preamble to initiate a RACH procedure. The BS is configured to transmit a first RAR to the UE in response to receiving the preamble during a first portion of a RAR window. The BS is configured to determine that an RRC connection request is not received in response to the transmitted first RAR. The BS is configured to transmit a first plurality of RARs to the UE in a first plurality of slots during a second portion of the RAR window subsequent to the first (Continued)

portion of the RAR window upon determining that an RRC connection request was not received in response to the transmitted first RAR. The UE is configured to receive, from the BS, the plurality of RARs in response to the transmitted preamble.

28 Claims, 9 Drawing Sheets

(56) References Cited

U.S. PATENT DOCUMENTS

| | | | | |
|---|---|---|---|---|
| 2016/0143059 A1* | 5/2016 | Jha | ............... | H04W 76/10 370/329 |
| 2016/0183295 A1* | 6/2016 | Liu | ............... | H04W 74/002 370/330 |
| 2016/0242212 A1* | 8/2016 | Wong | ............... | H04W 74/0833 |
| 2016/0330766 A1* | 11/2016 | Liu | ............... | H04W 72/0446 |
| 2017/0280481 A1* | 9/2017 | Stern-Berkowitz | ............... | H04L 1/1854 |
| 2017/0280483 A1 | 9/2017 | Liu et al. | | |
| 2017/0290016 A1* | 10/2017 | Yi | ............... | H04W 72/042 |
| 2017/0303317 A1* | 10/2017 | Islam | ............... | H04W 72/12 |
| 2018/0070380 A1* | 3/2018 | Nagaraja | ............... | H04B 7/00 |
| 2019/0044659 A1* | 2/2019 | Alnås et al. | ............... | H04W 16/26 |
| 2021/0168873 A1* | 6/2021 | Taherzadeh Boroujeni | ............... | H04W 72/085 |
| 2021/0195458 A1* | 6/2021 | Priyanto | ............... | H04W 74/0833 |

OTHER PUBLICATIONS

International Search Report and Wrtten Opinion—PCT/US2020/062713—ISA/EPO—dated Feb. 16, 2021.

* cited by examiner

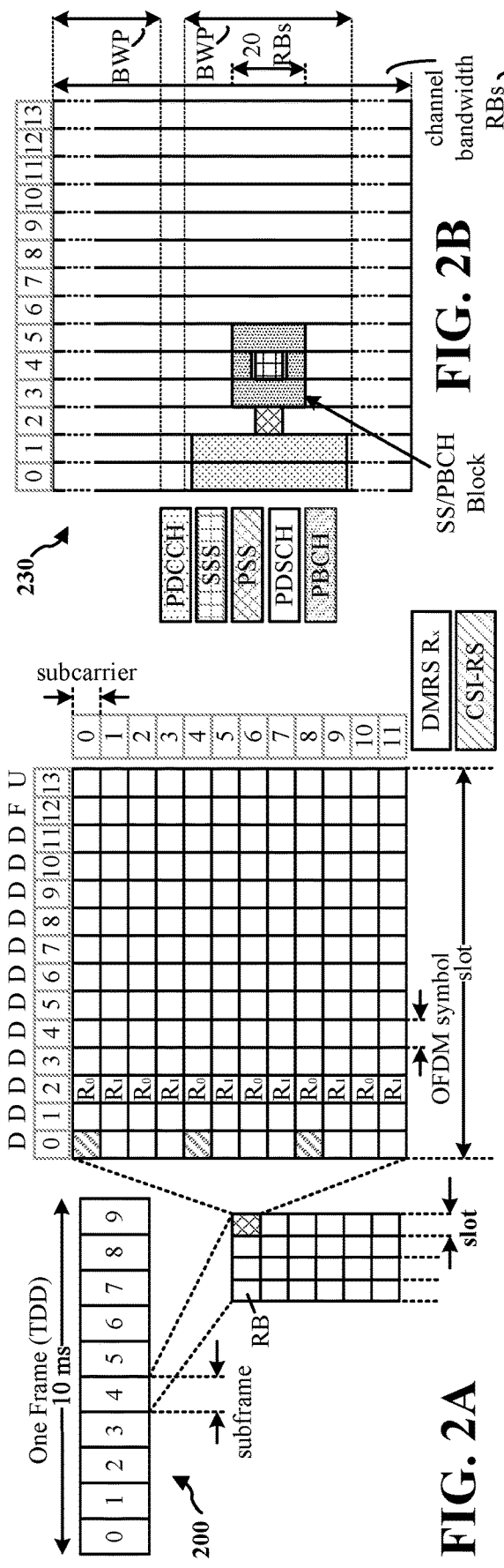
FIG. 2A
FIG. 2B
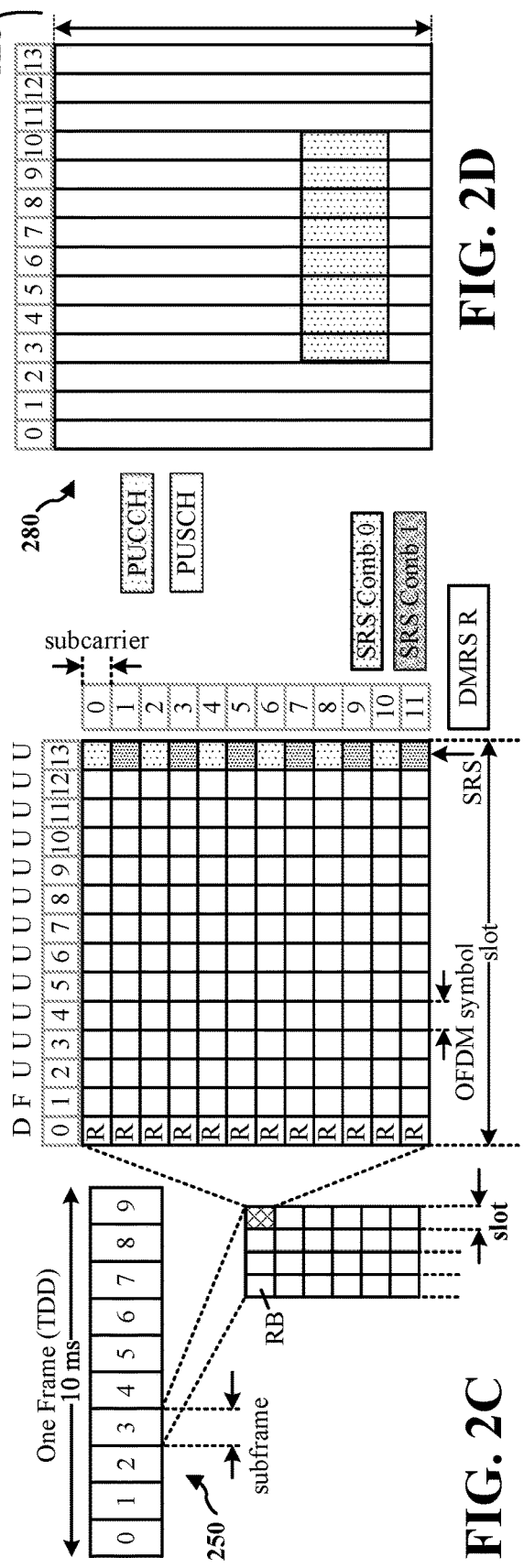
FIG. 2C
FIG. 2D

MESSAGE 2 PDSCH REPETITION BASED ON MULTI-SEGMENT RAR WINDOW

CROSS REFERENCE TO RELATED APPLICATION(S)

This application claims the benefit of U.S. Provisional Application Ser. No. 62/952,001, entitled "MESSAGE 2 PDSCH REPETITION BASED ON MULTI-SEGMENT RAR WINDOW" and filed on Dec. 20, 2019, the disclosure of which is expressly incorporated by reference herein in its entirety.

BACKGROUND

Technical Field

The present disclosure generally relates to communication systems, and more particularly, to a message 2 (msg2) random access channel (RACH) response (RAR) physical downlink shared channel (PDSCH) repetition based on a multi-segment RAR window.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or modem at a user equipment (UE) or the UE itself. The device is configured to transmit, to a base station, a preamble to initiate a RACH procedure. In addition, the device is configured to receive, from the base station, a plurality of RARs in response to the transmitted preamble. The plurality of RARs are received in a plurality of slots during a portion of a RAR window.

In an aspect of the disclosure, a method, a computer-readable medium, and an apparatus are provided. The apparatus may be a device at a base station (BS). The device may be a processor and/or modem at a BS or the BS itself. The device is configured to receive, from a UE, a preamble to initiate a RACH procedure. In addition, the device is configured to transmit a first RAR to the UE in response to receiving the preamble. The first RAR is transmitted during a first portion of a RAR window. In addition, the device is configured to determine that a radio resource control (RRC) connection request is not received in response to the transmitted first RAR. Further, the device is configured to transmit a first plurality of RARs to the UE in a first plurality of slots during a second portion of the RAR window subsequent to the first portion of the RAR window upon determining that the RRC connection request was not received in response to the transmitted first RAR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
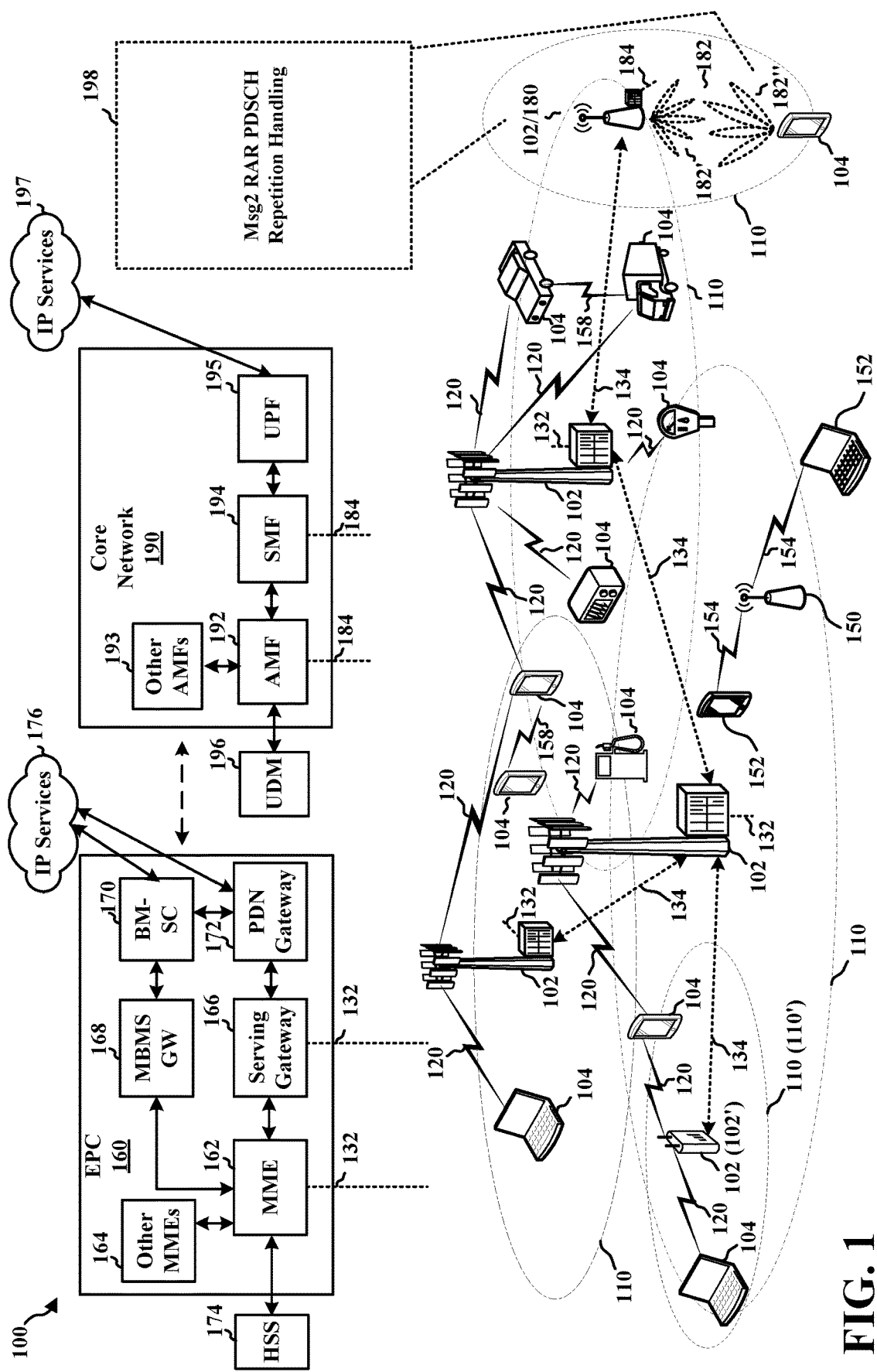
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, both the UE 104 and the base station 180 may be configured for msg2 RAR PDSCH repetition handling as discussed below in relation to FIGS. 4, 5A, 5B, 6, 7 (198).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
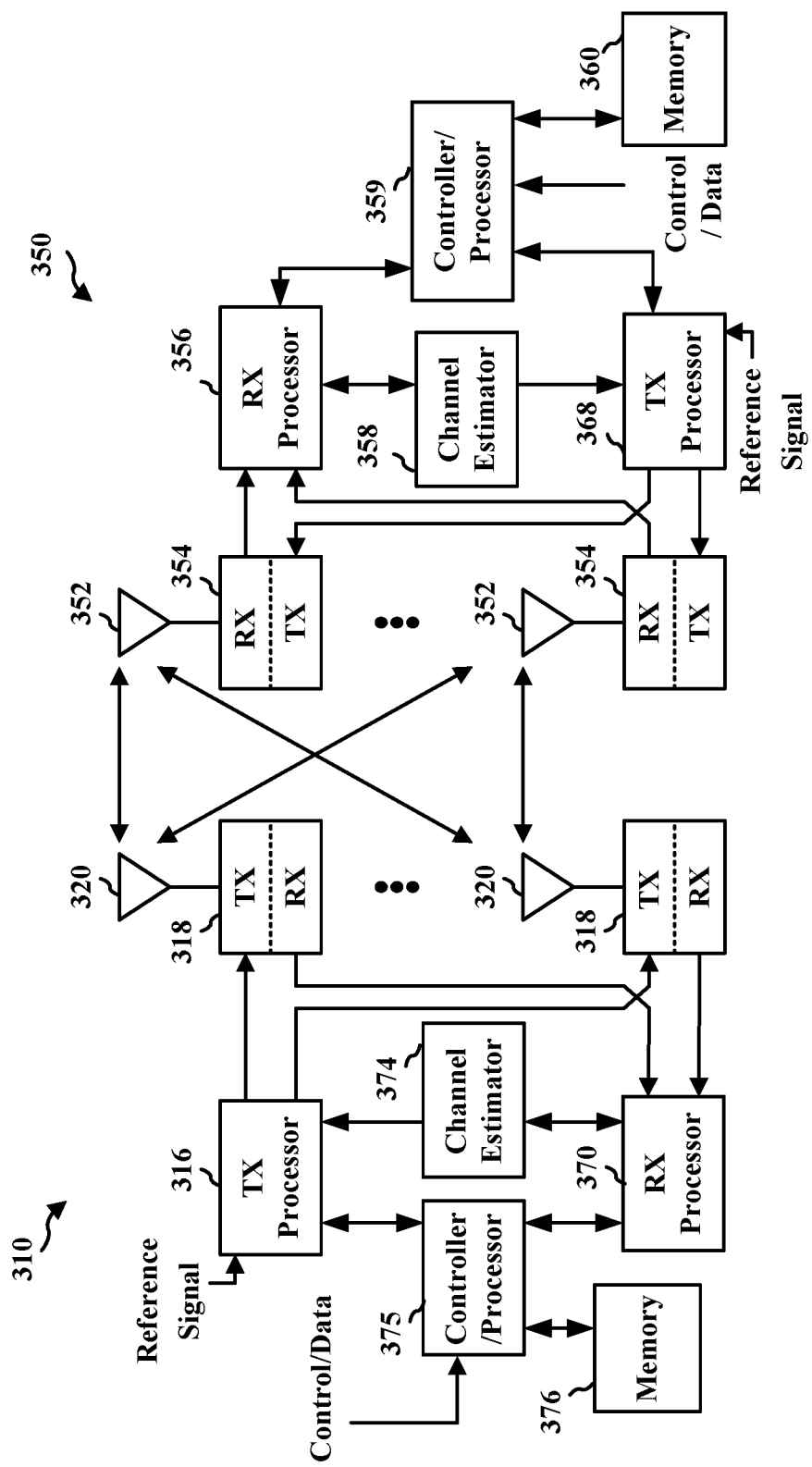
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In NR and LTE, msg2 (i.e., a RAR) is transmitted from the BS to a UE and is an important step of initial access (i.e., a RACH procedure). However, in millimeter-wave transmissions, because of high path loss of the millimeter wave and a lack of a narrow beam for initial access (i.e., the beam is broader for initial access), msg2 performance is a bottleneck in the coverage of the system. That is, RACH procedures typically do not allow for use of narrow beams, which otherwise could compensate for the high path loss associated with mmW transmissions, and thus the BS generally transmits RAR data in PDSCH to the UE using a wide beam resulting in consequentially weaker coverage. As such, there is a need to improve the coverage of the msg2 RAR PDSCH. Aspects of the present disclosure provide an improvement in this coverage by allowing the base station and UE to apply RAR PDSCH repetition, as discussed below with respect to FIGS. 4, 5A, and 5B.

Figure 4:
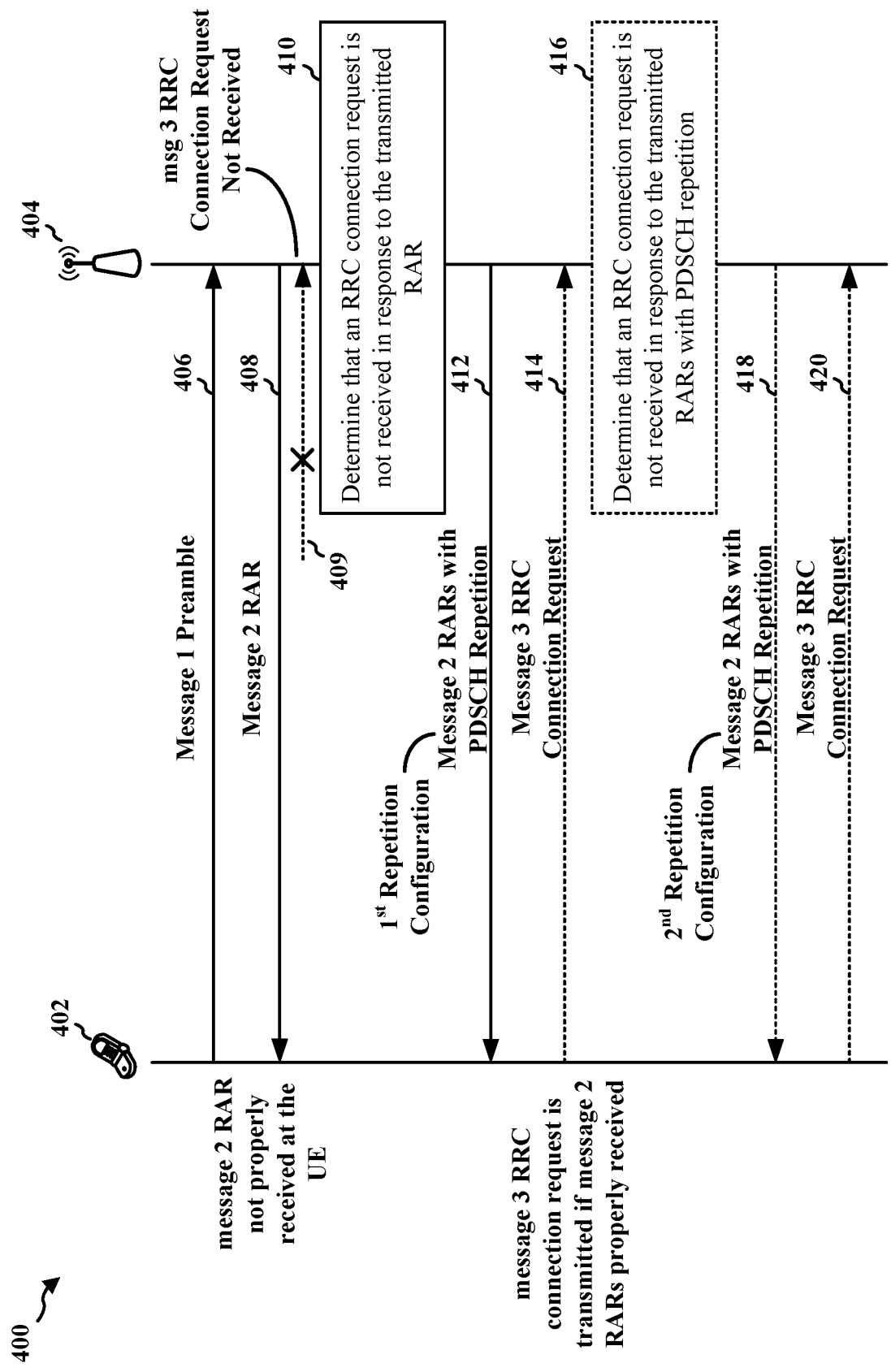
FIG. 4 is a call flow diagram illustrating msg2 RAR PDSCH repetition.
Figures 5A, 5B:
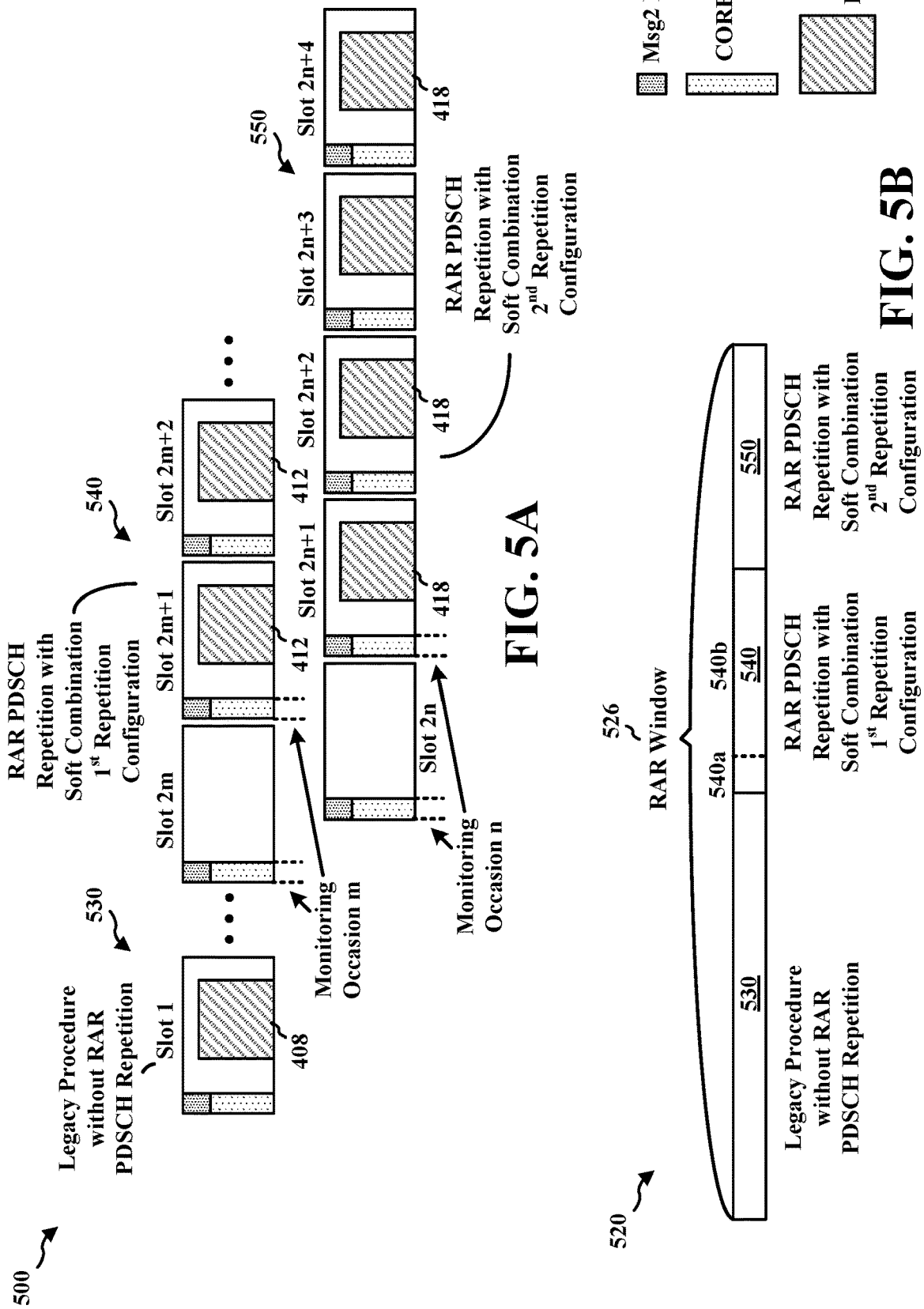
FIG. 5A is a first diagram illustrating msg2 RAR PDSCH repetition
FIG. 5B is a second diagram illustrating msg2 RAR PDSCH repetition.

FIG. 4 is a call flow diagram 400 illustrating an example of a call flow between a UE and a base station applying msg2 RAR PDSCH repetition. FIG. 5A is a first diagram 500 illustrating an example of msg2 RAR PDSCH repetition. FIG. 5B is a second diagram 520 illustrating of an example of a RAR window including msg2 RAR PDSCH repetition. As illustrated in FIG. 4, a UE 402 transmits, to a BS 404, a preamble 406 to initiate a RACH procedure. The BS 404 subsequently transmits a msg2 RAR 408 to the UE 402 in response to the received preamble 406. If the BS 404 determines at 410 that the UE 402 did not receive the msg2 RAR 408, such as by determining at 410 that a message 3 (msg3) RRC connection request 409 is not received from the UE 402 in response to the transmitted msg2 RAR 408, the BS 404 transmits msg2 RARs 412 with PDSCH repetition to the UE 402. The UE 402 may receive, from the BS 404, the plurality of RARs 412 (i.e., the msg2 RARs with PDSCH repetition) in response to the transmitted preamble 406. For example, referring to FIGS. 5A and 5B, the UE 402 may receive the plurality of RARs 412 in a plurality of slots 2m+1, 2m+2 during a portion 540 of a RAR window 526. If the UE 402 properly receives the plurality of RARs 412, the UE transmits a msg3 RRC connection request 414 to the BS 404.

In one configuration, if the BS 404 determines at 416 that the UE 402 did not receive the msg2 RARs 412 with PDSCH repetition, such as by determining that a msg3 RRC connection request 414 is not received from the UE 402 in response to the transmitted msg2 RARs 412 with PDSCH repetition, the BS 404 again transmits msg2 RARs 418 with PDSCH repetition to the UE 402. The UE 402 receives, from the BS 404, the plurality of RARs 418 (i.e., the msg2 RARs with PDSCH repetition) in response to the transmitted preamble 406. For example, referring to FIGS. 5A and 5B, the UE 402 may receive the plurality of RARs 418 in a plurality of slots 2n+1, 2n+2 during a portion 550 of the RAR window 526. Assuming that the UE 402 properly received the msg2 RARs 418, the UE 402 transmits a msg3 RRC connection request 420 to the BS 404. The msg2 RARs 412 may be transmitted based on a first repetition configuration and the msg2 RARs 418 may be transmitted based on a second repetition configuration. In one example, the second repetition configuration may include more repetitions than the first repetition configuration.

Referring to FIGS. 5A and 5B, after the BS 404 receives the message 1 (msg1) preamble 406, the BS 404 may transmit a msg2 PDCCH in slot 1 of a legacy segment 530 of the RAR window 526. The msg2 PDCCH may be within DL control information (DCI) of a CORESET which schedules a PDSCH that carries the msg2 RAR 408. Subsequently, in slot 1 of the RAR window, the BS 404 may transmit the msg2 RAR 408. If the BS 404 determines at 410 that the UE 402 did not receive the msg2 RAR 408 properly, the BS 404 may transmit one or more msg2 PDCCHs (e.g., in slot 2m and slot 2m+1 of portion 540) to schedule the plurality of msg2 RARs 412. The BS 404 may configure the number of msg2 RARs 412 for transmission (i.e., the number of msg2 PDSCH repetitions during portion 540) to be two, although this number may be different in other examples. Additionally, as illustrated in the example of FIG. 5A, the msg2 PDCCHs may also be configured with repetition (i.e., they are transmitted in more than one slot) during portion 540. For instance, the BS 404 may transmit two msg2 PDCCHs in slots 2m and 2m+1 respectively, where each msg2 PDCCH schedules one of the two, msg2 RARs 412 to be received in the PDSCHs of slots 2m+1, 2m+2, respectively. For instance, the msg2 PDCCH in slot 2m may schedule the msg2 PDSCH in slot 2m+1, and the msg2 PDCCH in slot 2m+1 may schedule the msg2 PDSCH in slot 2m+2. In other examples, the msg2 PDCCHs may not be configured with repetition. For instance, a single msg2 PDCCH in slot 2m may schedule the msg2 PDSCH repetitions in portion 540 (e.g. in slots 2m+1 and 2m+2).

If the BS 404 determines at 416 that the UE 402 did not receive the msg2 RARs 412 with repetition properly, the BS 404 may transmit one or more additional msg2 PDCCHs (e.g., in slot 2n and slot 2n+1 of portion 550) to schedule the second plurality of msg2 RARs 418. The BS 404 may configure the number of msg2 RARs 418 for transmission (i.e., the number of msg2 PDSCH repetitions during portion 550) to be four, although this number may be different in other examples. Additionally, as illustrated in the example of FIG. 5A, the msg2 PDCCHs may again be configured with repetition (i.e., they are transmitted in more than one slot) during portion 550. For instance, the BS 404 may transmit four msg2 PDCCHs in slots 2n, 2n+1, 2n+2 and 2n+3, respectively, where each msg2 PDCCH schedules one of the four, msg2 RARs 418 to be received in the PDSCHs of slots 2n+1, 2n+2, 2n+3, 2n+4, respectively. For instance, the msg2 PDCCH in slot 2n may schedule the msg2 PDSCH in slot 2n+1, and the msg2 PDCCH in slot 2n+1 may schedule the msg2 PDSCH in slot 2n+2, the msg2 PDCCH in slot 2n+2 may schedule the msg2 PDSCH in slot 2n+3, and the msg2 PDCCH in slot 2n+3 may schedule the msg2 PDSCH in slot 2n+4. In other examples, the msg2 PDCCHs may not be configured with repetition. For instance, a single msg2 PDCCH in slot 2n may schedule the msg2 PDSCH repetitions in portion 550 (e.g. in slots 2n+1, 2n+2, 2n+3 and 2n+4).

The UE 402/BS 404 may automatically apply a configured and/or pre-defined multi-slot repetition to the scheduled msg2 PDSCH, based on the time of the scheduling PDCCH or the time of the scheduled PDSCH itself. For example, if the BS 404 transmits a msg2 PDCCH or schedules a msg2 PDSCH during legacy segment 530, the UE and BS may not apply any msg2 PDSCH repetition (i.e., only one msg2 RAR 408 is transmitted and received as described above). In another example, if the BS 404 transmits a msg2 PDCCH or schedules a msg2 PDSCH during portion 540, the UE and BS may apply two-slot msg2 PDSCH repetition (i.e., two msg2 RARs 412 are transmitted and received as described above). In a further example, if the BS 404 transmits a msg2 PDCCH or schedules a msg2 PDSCH during portion 550, the UE and BS may apply four-slot msg2 PDSCH repetition (i.e., four msg2 RARs 418 are transmitted and received as described above). Moreover, the UE 402 may be configured with a number of msg2 RAR PDSCH repetitions before receiving the PDCCH, or may receive the configuration with the number of msg2 RAR PDSCH repetitions within the PDCCH itself.

Referring to FIG. 5B, the RAR window 526 may be partitioned into two or multiple parts with increasing aggregation of slots for the repetition of the scheduled msg2 PDSCH. For example, if the base station configures the RAR window 526 to be ten slots in a system information block (e.g., SIB1), the base station may partition the RAR window 526 such that one slot is included in legacy segment 530 (without msg2 PDSCH repetition), four slots are included in portion 540 (with two-slot msg2 PDSCH repetition), and five slots are included in portion 550 (with four-slot msg2 PDSCH repetition). The additional slots (i.e., additional repetition) improve the probability that the UE will successfully receive the msg2 RAR PDSCH. For instance, the legacy segment 530 may correspond to slot 1, and the first msg2 PDSCH segment (i.e., portion 540) may correspond to slots 2m, 2m+1, 2m+2, etc. The second msg2 PDSCH segment (i.e., portion 550) may correspond to slots 2n, 2n+1, . . . , 2n+4, and may include a greater number of slots for the repetition than in portion 540.

Alternatively, the RAR window 526 may be appended by one or more additional segments. For example, rather than partitioning the RAR window 526 into the legacy segment 530 and portions 540, 550 such as described above, the base station may append one or more of the portions 540 and 550 to the end of the RAR window 526 including legacy segment 530. For instance, if the base station configures the RAR window 526 to be ten slots in SIB1, the base station may partition the RAR window 526 such that six slots are included in legacy segment 530 and four slots are included in portion 540, and the base station may append an additional five slots for portion 550 to the end of the RAR window (e.g., effectively resulting in a fifteen slot RAR window).

Regardless of whether the RAR window is partitioned or appended, the receiver/UE 402 may soft combine the repeated msg2 RAR PDSCHs to decode the data in the msg2 RAR. The repetition may also be applied based on whether the scheduling PDCCH is inside the corresponding RAR window portion. For example, as described above, the UE 402 and BS 404 may apply no msg2 PDSCH repetition during legacy segment 530, two-slot msg2 PDSCH repetition during portion 540 of a partitioned or appended RAR window, or four-slot msg2 PDSCH repetition during portion 550 of a partitioned or appended RAR window.

During msg2 PDSCH repetition, the same time and frequency resource allocation, i.e., symbols and RBs, and other transmission parameters such as MCS (according to the scheduling PDCCH) may be applied for the repeated transmissions. For instance, when the BS 404 sends msg2 PDCCH including DCI, the DCI may indicate that the same number of symbols, RBs, MCS, and other transmission parameters are to be used for PDSCH in msg2 RARs 412 and msg2 RARs 418 (as well as msg2 RAR 408). Thus, a msg2 PDCCH in legacy segment 530 may indicate the transmission parameters for a msg2 PDSCH repetition in portion 540, 550, or a msg2 PDCCH in portion 540 may indicate the transmission parameters for a msg2 PDSCH repetition in portion 550.

Alternatively, a preconfigured or predefined change in frequency resource allocation (e.g., based on a preconfigured frequency hopping) may be applied for different repetitions of the msg2 PDSCH. The UE 402 may receive the configuration of the different frequency hopping patterns for different segments of the RAR window 526 through remaining system information (RMSI) in a SIB, or through DCI. For instance, when the BS 404 sends a SIB1 (RMSI) or msg2 PDCCH including DCI to the UE, the RMSI or DCI may indicate that msg2 RARs 412 and msg2 RARs 418 are transmitted on different frequencies or in different RBs according to a configured frequency hopping pattern indicated in the RMSI or DCI. For example, individual msg2 RARs 412 may be transmitted at different frequencies with respect to each other, individual msg2 RARs 418 may be transmitted at different frequencies with respect to each other, or msg2 RARs 412 may be transmitted at different frequencies with respect to msg2 RARs 418. The frequency change may also be based on a configured frequency hopping pattern inside the active bandwidth part (BWP). For instance, the UE 402 and BS 404 may respectively receive and transmit msg2 RARs 412 and msg2 RARs 418 on different frequencies or RBs based on a pre-defined mapping of a frequency hopping pattern to the BWP in which the RAR window 526 is received.

A portion of the RAR window 526 that is corresponding to msg2 PDSCH repetition may be also corresponding to msg2 PDCCH repetition. That is, the msg2 PDCCH repetition may be in the same or different segment portions of the RAR window 526 which includes the msg2 PDSCH repetition. In other words, the PDCCHs and the PDSCHs may be in different segments or may be in the same segment, and the repetition may be applied differently based on whether the PDSCHs share segmentation with the PDCCHs. For example, both a msg2 PDCCH repetition and a msg2 PDSCH repetition may be within the portion 540, or they may be split up into segments 540a, 540b, respectively. In such example, segment 540a of portion 540 may include msg2 PDCCH repetition but no msg2 PDSCH repetition (or vice-versa), segment 540b of portion 540 may include msg2 PDSCH repetition but no msg2 PDCCH repetition (or vice-versa), and portion 550 may include both msg2 PDCCH repetition and msg2 PDSCH repetition (or only one of the two). Alternatively or additionally, the number of repetitions for msg2 PDSCH and its scheduling PDCCH may be different. For example, in portion 550, the number of msg2 PDCCH repetitions may be two while the number of msg2 PDSCH repetitions may be four. The difference in number between msg2 PDCCH repetitions and msg2 PDSCH repetitions may be applied similarly or differently in one or more of portions 540 or 550 as well as in split portions (e.g. in one or more of segment 540a or 540b).

The addition of appended segments and/or partitions of the RAR window and/or the number of PDSCH repetitions corresponding to each segment of RAR window may be signaled by an additional bit in the system information bitfield that defines the RAR window length. For example, when the BS 404 configures a SIM including a parameter defining the RAR window length in RMSI (e.g., ra-Response Window or another name), one or more additional bits may be added to the parameter (or the configuration including the parameter) which the BS 404 may set to indicate whether msg2 RAR repetition is applied, the parameters of the portions 540, 550 of the RAR window 526 in which msg2 RAR repetition is applied, whether the portions 540, 550 are partitions of RAR window 526 or appended segments to the RAR window 526, and the number of msg2 RAR repetitions within each portion. Alternatively, the related information (e.g., the above information) may be indicated in other parts of RMSI.

Alternatively, the addition of appended segments and/or partition of the RAR window and/or the number of PDSCH repetitions corresponding to each segment of RAR window may be signaled in one or multiple bits in the MIB carried by the PBCH. For example, when the BS 404 configures a MIB scheduling the SIB1, one or more additional bits may similarly be added to the MIB which the BS 404 may set to indicate whether msg2 RAR repetition is applied, the parameters of the portions 540, 550 of the RAR window 526 in which msg2 RAR repetition is applied, whether the portions 540, 550 are partitions of RAR window 526 or appended segments to the RAR window 526, and the number of msg2 RAR repetitions within each portion.

Moreover, the mapping between the bitfield/s of the system information that are used for indicating parameters of the RAR window and the segments of the RAR window and/or their corresponding length in time and/or their associated PDSCH repetition number may be pre-defined, e.g., by a fixed table and/or by one of multiple mappings, depending on some bitfield in the MIB. For example, when the BS 404 configures a MIB scheduling the SIB1, the BS 404 may indicate the system information based on one or more pre-defined mappings between the system information and a value or index of a bitfield in the MIB. For instance, the BS 404 may set one or more bits in the MIB to one or more pre-defined indices which indicate whether msg2 RAR repetition is applied, the parameters of the portions 540, 550 of the RAR window 526 in which msg2 RAR repetition is applied, whether the portions 540, 550 are partitions of RAR window 526 or appended segments to the RAR window 526, and the number of msg2 RAR repetitions within each portion.

In case of dual connectivity, the addition of appended segments and/or partition of the RAR window and/or the number of PDSCH repetitions corresponding to each segment of RAR window may be configured by RRC of another link. For example, in E-UTRA-NR dual connectivity (EN-DC), the BS 404 may be a gNB operating in NR, and the UE 402 may be connected to the BS 404 in addition to another BS which may be an eNB operating in LTE. Alternatively, the BS 404 may include two separate nodes (an eNB and a gNB). In either case, the eNB may send RRC messages and other control information to the UE while the gNB sends data to the UE. Accordingly, in such example, the eNB may configure the MIB scheduling the SIB1 and indicate the system information (e.g. in RMSI, in MIB, or based on a pre-defined mapping) to the UE, after which the gNB transmits the msg2 RAR to the UE as described above. In other examples besides EN-DC (where the dual connectivity is not inter-RAT), one node or BS may configure the system information for the msg2 RAR while the other node or BS may transmit the msg2 RAR and repetitions.

In one example, as discussed above, repetition of the msg2 PDSCH may be done only in the later segment/s (e.g., portions 540 and 550, but not legacy segment 530) of the RAR window 526 and only for UEs whose msg3 response is not received (this avoids wasting resources cause by unnecessary PDSCH repetition for all UEs). In other examples, repetition of the msg2 PDSCH may be configured in the later segments (e.g., portions 540 and 550) for UEs regardless of whether msg3 responses are successfully received or not (e.g., based on the time when the msg2 PDCCH is transmitted or the msg2 PDSCH is scheduled as described above).

Figure 6:
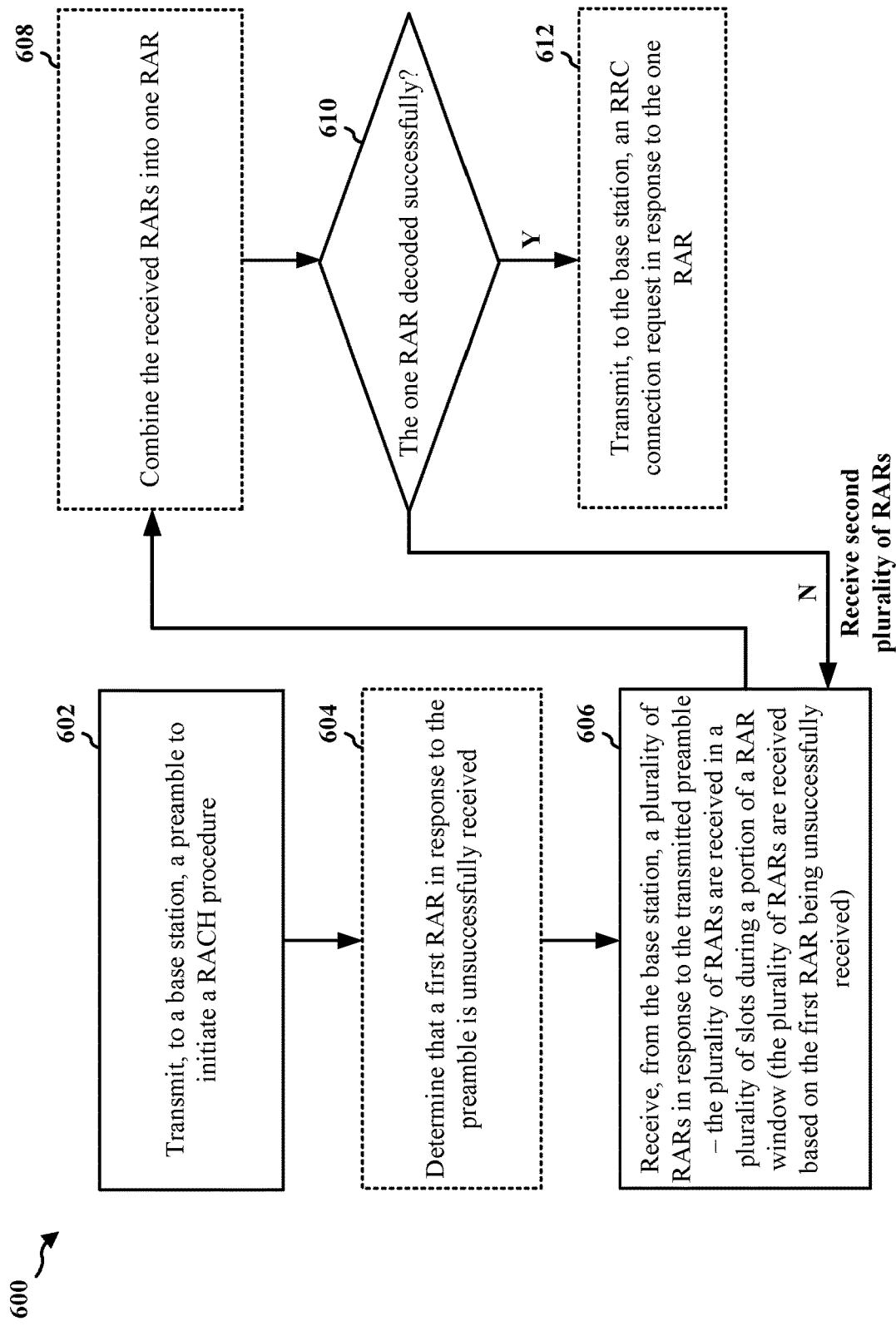
FIG. 6 is a flowchart of a method of wireless communication associated with a UE.

FIG. 6 is a flowchart 600 of a method of wireless communication. The method may be performed by a device at the UE 402 (e.g., the UE 104, 350, 402; the apparatus 802). The device may be a processor/modem with the UE 402 or the UE 402 itself. The device is herein referred to as UE. Optional aspects are illustrated in dashed lines. The method allows a UE to improve reception of data in msg2 RAR in mmW environments through msg2 RAR PDSCH repetition.

At 602, the UE transmits, to a base station, a preamble to initiate a RACH procedure. For example, 602 may be performed by preamble component 840. For example, referring to FIG. 4, the UE 402 transmits to the BS 404 a msg1 preamble 406 to initiate a RACH procedure.

At 606, the UE receives, from the base station, a plurality of RARs in response to the transmitted preamble. For example, 606 may be performed by RAR component 842. The plurality of RARs are received in a plurality of slots during a portion of a RAR window. For example, referring to FIGS. 4, 5A, 5B, the UE 402 receives, from the BS 404, a plurality of RARs 412 within slots 2m+1, 2m+2 of portion 540 in response to the transmitted preamble 406. The plurality of RARs 412 are received in a plurality of slots 2m+1, 2m+2 during a portion 540 of a RAR window 526.

In one configuration, at 604, the UE may determine that a first RAR in response to the preamble is unsuccessfully received. For example, 604 may be performed by determination component 844. In such a configuration, the plurality of RARs are received at 606 based on the first RAR being unsuccessfully received. For example, referring to FIG. 4, the UE may determine that a first RAR 408 in response to the preamble 406 is unsuccessfully received based on a msg3 RRC connection request 409 not being received from the UE 402. In such a configuration, the plurality of RARs 412 are received at 606 based on the first RAR 408 being unsuccessfully received.

In one configuration, at 608, the UE combines (e.g., through soft combining) the received RARs into one RAR, and at 610, attempts to decode the one RAR. For example, 608 may be performed by combine component 846 and 610 may be performed by decode component 848. If at 610, the UE decodes the one RAR successfully, then at 612, the UE transmits, to the base station, an RRC connection request in response to the one RAR. For example, 612 may be performed by RRC connection request component 850. However, if at 610, the UE decodes unsuccessfully the plurality of RARs, then returning to 606, the UE receives, from the base station, a second plurality of RARs in a second plurality of slots. The second plurality of RARs are received based on the plurality of RARs being unsuccessfully received. For example, referring to FIGS. 4, 5A, 5B, the UE 402 combines the received RARs 412 from PDSCHs in slots 2m+1, 2m+2 into one RAR, and at 610, attempts to decode the one RAR. If at 610, the UE 402 decodes the one RAR successfully, then at 612, the UE 402 transmits, to the BS 404, an RRC connection request 414 in response to the one RAR. However, if at 610, the UE 402 decodes unsuccessfully the plurality of RARs 412 from the PDSCHs in slots 2m+1, 2m+2, then returning to 606, the UE 402 receives, from the BS 404, a second plurality of RARs 418 in a second plurality of slots 2n+1, 2n+2, 2n+3, 2n+4. The second plurality of RARs 418 are received based on the plurality of RARs 412 being unsuccessfully received.

In one configuration, the second plurality of slots may include a greater number of slots than the plurality of slots. For example, referring to FIGS. 5A, 5B, the second plurality of slots 2n+1, 2n+2, 2n+3, 2n+4 in portion 550 includes four slots, whereas the plurality of slots 2m+1, 2m+2 in portion 540 include two slots.

In one configuration, each RAR of the plurality of RARs may be received with a same MCS, and in a same set of subcarriers and a same set of symbols within a corresponding slot of the plurality of slots. For example, referring to FIG. 5A, the RARs received in the slots 2m+1, 2m+2 may have the same MCS, and may occupy the same set of subcarriers and symbols within each slot. Likewise, the RARs received in the slots 2n+1, 2n+2, 2n+3, 2n+4 may have the same MCS, and may occupy the same set of subcarriers and symbols within each slot.

However, in another configuration, each RAR of the plurality of RARs may be received with a same MCS, and in a same set of symbols and different sets of subcarriers based on a hopping pattern for the plurality of RARs. That is, the RAR received in the slot 2m+2 may be within a different frequency range (based on a preconfigured hopping pattern) than the RAR received in the slot 2m+1. The same may be the case for the RARs received in the slots 2n+1, 2n+2, 2n+3, 2n+4.

In one configuration, the UE may receive at least one PDCCH scheduling a PDSCH for receiving the plurality of RARs. For example, referring to FIGS. 4, 5A, the UE 402 receives two PDCCHs (in slots 2m, 2m+1) scheduling the PDSCHs for receiving the plurality of RARs 412. In this example, msg2 PDCCH repetition is configured. If msg2 PDCCH repetition is not configured, the UE 402 may receive the PDCCH in only slot 2m+1 for scheduling the PDSCHs for receiving the plurality of RARs 412.

In one configuration, the at least one PDCCH scheduling the PDSCH for receiving the plurality of RARs includes a plurality of PDCCHs, each including the same information for scheduling the PDSCH for receiving the plurality of RARs. For example, referring to FIGS. 4, 5A, the at least one PDCCH scheduling the PDSCH for receiving the plurality of RARs 412 includes a plurality of PDCCHs in slots 2m, 2m+1, each including the same information for scheduling the PDSCH for receiving the plurality of RARs 412.

In one configuration, the at least one PDCCH is received during a first configured segment of the RAR window, and the plurality of RARs are received during a second configured segment of the RAR window subsequent to the first configured segment of the RAR window. For example, referring to FIGS. 4, 5A, 5B, the portion 540 of the RAR window 526 may be split into two segments 540a, 540b, and the at least one PDCCH may be received during a first configured segment 540a of the RAR window 526 within the portion 540, and the plurality of RARs 412 may be received during a second configured segment 540b of the RAR window 526 within the portion 540 subsequent to the first configured segment 540a of the RAR window 526 within the portion 540.

In one configuration, the at least one PDCCH is received during a first configured segment of the RAR window, and the plurality of RARs are received during the first configured segment of the RAR window. For example, referring to FIGS. 4, 5A, 5B, the portion 540 of the RAR window 526 may not be subdivided into segments, the at least one PDCCH may be received during a first configured segment (portion 540) of the RAR window 526, and the plurality of RARs 412 may be received during the first configured segment (portion 540) of the RAR window 526.

In one configuration, the UE receives a configuration indicating a hopping pattern for receiving the plurality of RARs. The configuration may be received through one of DCI or system information. In such a configuration, the plurality of RARs are received based on the received configuration. For example, referring to FIGS. 4, 5A, the UE 402 may receive a configuration indicating a hopping pattern for receiving the plurality of RARs 412 within the PDSCHs of the slots 2m+1, 2m+2. The configuration may be received through one of DCI or system information (e.g., SDB1 or RMSI). In such a configuration, the UE 402 receives the plurality of RARs 412 based on the received configuration.

In one configuration, the UE may receive a configuration indicating whether RAR repetition is configured. The configuration may be received through one of a MIB or system information. In such a configuration, the plurality of RARs are received based on the received configuration. For example, referring to FIGS. 4, 5A, the UE 402 may receive a configuration indicating whether RAR repetition is configured after the legacy segment 530. The configuration may be received through one of a MIB or system information (e.g., SIB1 or RMSI). In such a configuration, the plurality of RARs 412 are received based on the received configuration, assuming RAR repetition is configured.

In one configuration, the UE may receive a configuration indicating at least one of a partition of the RAR window for RAR repetitions, a segment within the RAR window for the RAR repetitions, or a number of RAR repetitions for each RAR window partition or segment. The configuration may be received through one of a MIB, system information, or an RRC message. In such a configuration, the plurality of RARs are received based on the received configuration. For example, referring to FIGS. 5A, 5B, the UE 402 may receive a configuration indicating at least one of a partition of the RAR window 526 for RAR repetitions (e.g., portion 540 or 550), one or more segments within the RAR window 526 for the RAR repetitions (e.g., segments 540*a*, 540*b*), or a number of RAR repetitions for each RAR window partition or segment (e.g., as illustrated, two for portion 540, and four for portion 550). The configuration may be received through one of a MIB, system information (SIB1 or RMSI), or an RRC message. In such a configuration, the plurality of RARs 412 are received based on the received configuration.

Figure 7:
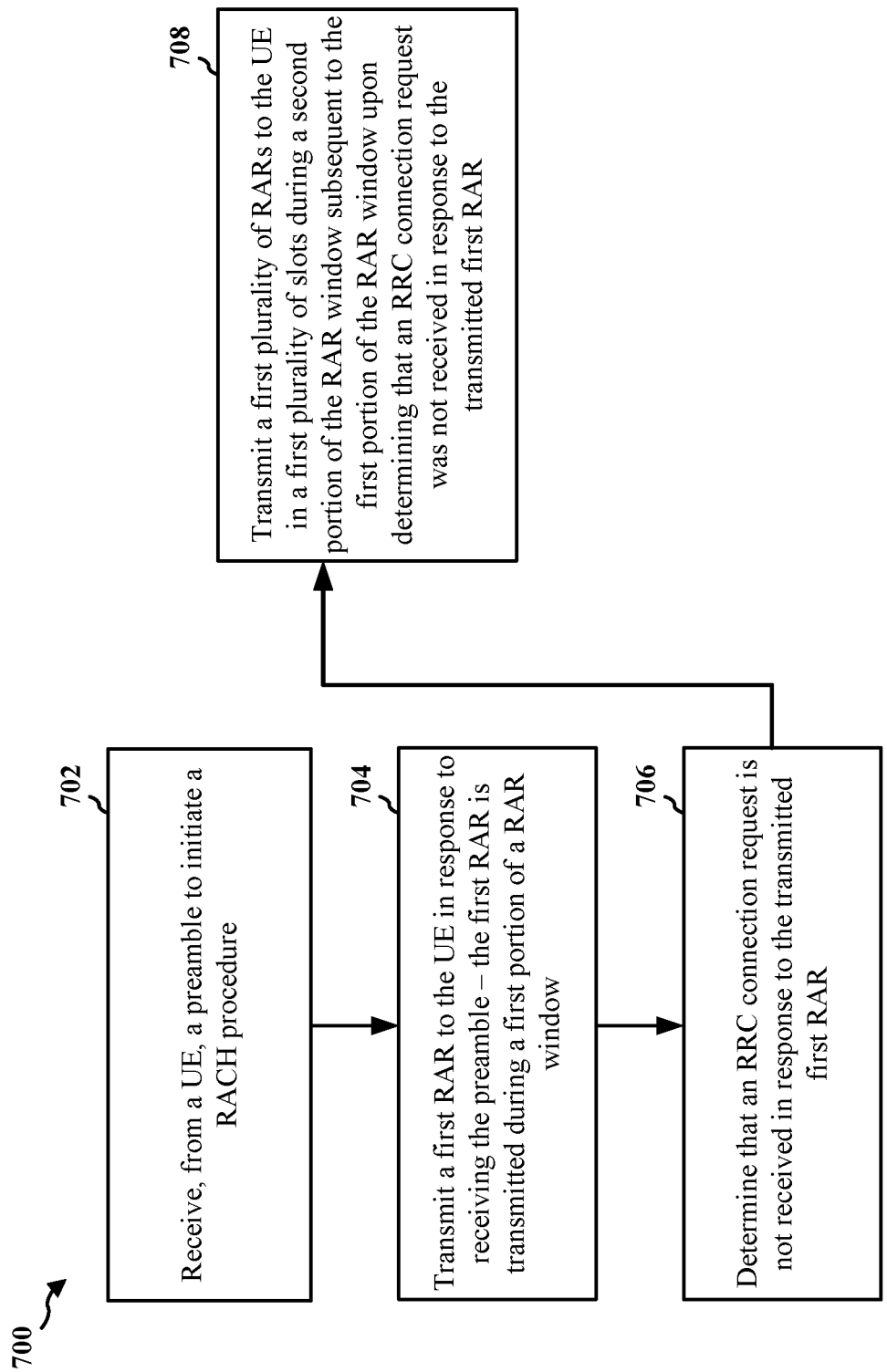
FIG. 7 is a flowchart of a method of wireless communication associated with a BS.

FIG. 7 is a flowchart 700 of a method of wireless communication. The method may be performed by a device at the BS 404 (e.g., the base station 102/180, 310, 404; the apparatus 902). The device may be a processor/modem with the BS 404 or the BS 404 itself. The device is herein referred to as BS. Optional aspects are illustrated in dashed lines. The method allows a BS to improve transmission of data in msg2 RAR in mmW environments through msg2 RAR PDSCH repetition.

At 702, the BS receives, from a UE, a preamble to initiate a RACH procedure. For example, 702 may be performed by preamble component 940. For example, referring to FIG. 4, the BS 404 receives, from a UE 402, a preamble 406 to initiate a RACH procedure.

At 704, the BS transmits a first RAR to the UE in response to receiving the preamble. For example, 704 may be performed by RAR component 942. The first RAR is transmitted during a first portion of a RAR window. For example, referring to FIGS. 4, 5A, 5B, the BS 404 transmits a first RAR 408 to the UE 402 in response to receiving the preamble 406. The first RAR 408 is transmitted during a first portion (e.g., legacy segment 530) of a RAR window 526.

At 706, the BS determines that an RRC connection request is not received in response to the transmitted first RAR. For example, 706 may be performed by determination component 944. For example, referring to FIG. 4, the BS 404 determines at 410 that an RRC connection request 409 is not received in response to the transmitted first RAR 408. The BS 404 may determine at 410 that an RRC connection request 409 is not received in response to the transmitted first RAR 408 when the BS 404 fails to decode an RRC connection request 409 from the UE 402.

At 708, the BS transmits a first plurality of RARs to the UE in a first plurality of slots during a second portion of the RAR window subsequent to the first portion of the RAR window upon determining that the RRC connection request was not received in response to the transmitted first RAR. For example, 708 may also be performed by RAR component 942. For example, referring to FIGS. 4, 5A, 5B, the BS 404 transmits a first plurality of RARs 412 to the UE 402 in a first plurality of slots 2m+1, 2m+2 during a second portion (e.g., portion 540) of the RAR window 526 subsequent to the first portion (e.g., legacy segment 530) of the RAR window 526 upon determining at 410 that an RRC connection request 409 was not received in response to the transmitted first RAR 408.

In one configuration, the BS receives, from the UE, an RRC connection request in response to the transmitted first plurality of RARs. For example, referring to FIG. 4, the BS 404 may receive, from the UE 402, an RRC connection request 414 in response to the transmitted first plurality of RARs 412.

In one configuration, the BS determines that a second RRC connection request is not received in response to the transmitted first plurality of RARs. In addition, the BS transmits a second plurality of RARs to the UE in a second plurality of slots during a third portion of the RAR window subsequent to the second portion of the RAR window upon determining that the second RRC connection request was not received in response to the transmitted first plurality of RARs. For example, referring to FIGS. 4, 5A, 5B, the BS 404 determines at 416 that an RRC connection request 414 is not received in response to the transmitted first plurality of RARs 412. In addition, the BS 404 transmits a second plurality of RARs 418 to the UE 402 in a second plurality of slots 2n+1, 2n+2, 2n+3, 2n+4 during a third portion (e.g., portion 550) of the RAR window 526 subsequent to the second portion (e.g., portion 540) of the RAR window 526 upon determining that the RRC connection request 414 was not received in response to the transmitted first plurality of RARs 412.

In one configuration, the second plurality of slots include a greater number of slots than the first plurality of slots. For example, referring to FIG. 5A, the second plurality of slots 2n+1, 2n+2, 2n+3, 2n+4 include a greater number of slots than the first plurality of slots 2m+1, 2m+2. In one configuration, the BS 404 receives, from the UE 402, an RRC connection request 420 in response to the transmitted second plurality of RARs 418.

In one configuration, each RAR of the first plurality of RARs is transmitted with a same MCS, and in a same set of subcarriers and a same set of symbols within a corresponding slot of the first plurality of slots. For example, referring to FIGS. 4, 5A, each RAR of the first plurality of RARs 412 may be transmitted with a same MCS, and in a same set of subcarriers and a same set of symbols within a corresponding slot of the first plurality of slots 2m+1, 2m+2. Likewise, the RARs in the second plurality of slots 2n+1, 2n+2, 2n+3, 2n+4 may be transmitted with the same MCS within the same set of subcarriers and symbols within a slot.

In one configuration, each RAR of the first plurality of RARs is transmitted with a same MCS, and in a same set of symbols and different sets of subcarriers based on a hopping pattern for the first plurality of RARs. For example, referring to FIGS. 4, 5A, each RAR of the first plurality of RARs 412 may be transmitted with a same MCS, and in a same set of symbols and different sets of subcarriers based on a hopping pattern for the first plurality of RARs 412. Likewise, each RAR of the second plurality of RARs 418 may be transmitted with the same MCS, the same symbols, but with different subcarriers defined by a preconfigured hopping pattern.

In one configuration, the BS transmits at least one PDCCH scheduling PDSCHs for transmissions of the first plurality of RARs. For example, referring to FIGS. 4, 5A, the BS 404 transmits at least one PDCCH in slots 2m, 2m+1 scheduling PDSCHs in slots 2m+1, 2m+2 for transmissions of the first plurality of RARs 412. In one configuration, the at least one PDCCH scheduling the PDSCH for transmissions of the first plurality of RARs includes a plurality of PDCCHs, each including the same information for scheduling the PDSCHs for transmissions of the first plurality of RARs. For example, referring to FIGS. 4, 5A, the at least one PDCCH scheduling the PDSCH for transmissions of the first plurality of RARs 412 includes a plurality of PDCCHs (in FIG. 5A, two PDCCHs are included), each including the same information for scheduling the PDSCHs for transmissions of the first plurality of RARs 412. In this configuration, msg2 PDCCH itself is configured with repetition of two. In one configuration, the at least one PDCCH is transmitted during a first configured segment of the RAR window, and the first plurality of RARs are transmitted during a second configured segment of the RAR window subsequent to the first configured segment of the RAR window. For example, referring to FIGS. 4, 5A, 5B, the at least one PDCCH is transmitted during a first configured segment (e.g., segment 540*a*) of the RAR window 526, and the first plurality of RARs 412 are transmitted during a second configured segment (e.g., segment 540*b*) of the RAR window 526 subsequent to the first configured segment (e.g., segment 540*a*) of the RAR window 526 (here, the portion 540 is split into separate segments 540*a*, 540*b* for msg2 PDCCH (with or without repetition) and msg2 PDSCH repetition, respectively). In one configuration, the at least one PDCCH is transmitted during a first configured segment of the RAR window, and the first plurality of RARs are transmitted during the first configured segment of the RAR window. For example, referring to FIGS. 4, 5A, the at least one PDCCH is transmitted during a first configured segment (e.g., portion 540) of the RAR window 526, and the first plurality of RARs 412 are transmitted during the first configured segment (e.g., portion 540) of the RAR window 526 (here, the portion 540 is not split into separate segments 540*a*, 540*b* for msg2 PDCCH (with or without repetition) and msg2 PDSCH repetition, respectively).

In one configuration, the BS transmits a configuration indicating a hopping pattern for the transmission of the first plurality of RARs. The configuration is transmitted through one of DCI or system information. The first plurality of RARs are transmitted based on the transmitted configuration. For example, referring to FIG. 4, the BS 404 transmits a configuration indicating a hopping pattern for the transmission of the first plurality of RARs 412. The configuration is transmitted through one of DCI or system information (e.g., SIB1 or RMSI). The first plurality of RARs 412 are transmitted based on the transmitted configuration.

In one configuration, the BS transmits a configuration indicating whether RAR repetition is configured. The configuration is transmitted through one of a MIB or system information. The first plurality of RARs are transmitted based on the transmitted configuration. For example, referring to FIG. 4, the BS 404 transmits a configuration indicating whether RAR repetition is configured. The configuration is transmitted through one of a MIB or system information (e.g., SIB1 or RMSI). The first plurality of RARs 412 are transmitted based on the transmitted configuration.

In one configuration, the BS transmits a configuration indicating at least one of a partition of the RAR window for RAR repetitions, a segment within the RAR window for the RAR repetitions, or a number of RAR repetitions for each RAR window partition or segment. The configuration is transmitted through one of a MIB, system information, or an RRC message. The first plurality of RARs are transmitted based on the transmitted configuration. For example, referring to FIGS. 4, 5A, 5B, the BS 404 transmits a configuration indicating at least one of a partition of the RAR window 526 for RAR repetitions (e.g., portion 540 or 550), a segment or segments within the RAR window 526 for the RAR repetitions (e.g., segments 540*a*, 540*b*), or a number of RAR repetitions for each RAR window partition or segment, respectively (e.g., two-slot or four-slot repetition). The configuration is transmitted through one of a MIB, system information (SIB1 or RMSI), or an RRC message. The first plurality of RARs 412 (and the second plurality of RARs 418) are transmitted based on the transmitted configuration.

Figure 8:
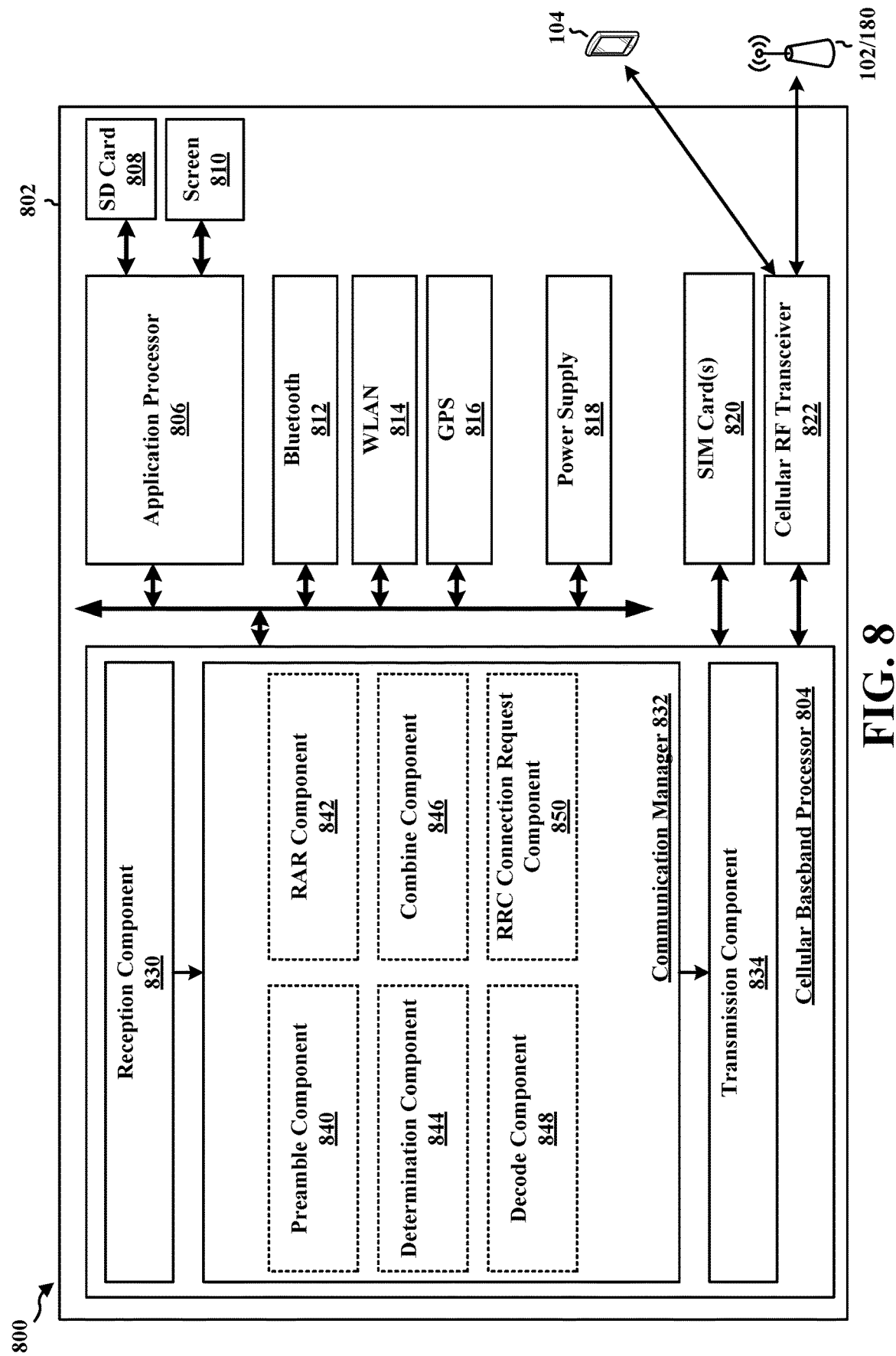
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a preamble component 840 that is configured to transmit, to a base station, a preamble to initiate a RACH procedure, e.g., as described in connection with 602. The communication manager 832 further includes a RAR component 842 that is configured to receive, from the base station, a plurality of RARs in response to the transmitted preamble, the plurality of RARs being received in a plurality of slots during a portion of a RAR window, e.g., as described in connection with 606.

In one configuration, the communication manager 832 further includes a determination component 844 that is configured to determine that a first RAR in response to the preamble is unsuccessfully received, where the plurality of RARs are received based on the first RAR being unsuccessfully received, e.g., as described in connection with 604.

In one configuration, the communication manager 832 further includes a combine component 846 that receives input in the form of the received RARs from RAR component 842 and is configured to combine the received RARs into one RAR, e.g., as described in connection with 608. The communication manager 832 further includes a decode component 848 that receives input in the form of the one RAR from the combine component 846 and is configured to decode the one RAR, e.g., as described in connection with 610. The communication manager 832 further includes a RRC connection request component 850 that receives input in the form of the one RAR from the combine component 846 and the decode component 848 and is configured to transmit, to the base station, a RRC connection request in response to the one RAR, e.g., as described in connection with 612.

In one configuration, the decode component 848 is configured to decode unsuccessfully the plurality of RARs, and the RAR component 842 is further configured to receive, from the base station, a second plurality of RARs in a second plurality of slots, the second plurality of RARs being received based on the plurality of RARs being unsuccessfully received, where the second plurality of slots include a greater number of slots than the plurality of slots.

In one configuration, the RAR component 842 is further configured to receive at least one PDCCH scheduling a PDSCH for receiving the plurality of RARs. In one configuration, the RAR component 842 is further configured to receive a configuration indicating a hopping pattern for receiving the plurality of RARs, the configuration being received through one of DCI or system information, the plurality of RARs being received based on the received configuration. In one configuration, the RAR component 842 is further configured to receive a configuration indicating whether RAR repetition is configured, the configuration being received through one of a MIB or system information, where the plurality of RARs are received based on the received configuration. In one configuration, the RAR component 842 is further configured to receive a configuration indicating at least one of a partition of the RAR window for RAR repetitions, a segment within the RAR window for the RAR repetitions, or a number of RAR repetitions for each RAR window partition or segment, the configuration being received through one of a MIB, system information, or a RRC message, where the plurality of RARs are received based on the received configuration.

The apparatus may include additional components that perform each of the blocks of the algorithm in the aforementioned flowcharts of FIGS. 4 and 6. As such, each block in the aforementioned flowcharts of FIGS. 4 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a base station, a preamble to initiate a RACH procedure; and means for receiving, from the base station, a plurality of RARs in response to the transmitted preamble, the plurality of RARs being received in a plurality of slots during a portion of a RAR window. In one configuration, the apparatus 802, and in particular the cellular baseband processor 804, may include means for determining that a first RAR in response to the preamble is unsuccessfully received, wherein the plurality of RARs are received based on the first RAR being unsuccessfully received. In one configuration, the apparatus 802, and in particular the cellular baseband processor 804, may include means for combining the received RARs into one RAR and means for decoding the one RAR, where the means for transmitting is further configured to transmit, to the base station, a radio resource control (RRC) connection request in response to the one RAR. In one configuration, the apparatus 802, and in particular the cellular baseband processor 804, may include means for decoding unsuccessfully the plurality of RARs, and the means for receiving may be further configured to receive, from the base station, a second plurality of RARs in a second plurality of slots, the second plurality of RARs being received based on the plurality of RARs being unsuccessfully received, where the second plurality of slots include a greater number of slots than the plurality of slots. In one configuration, the means for receiving is further configured to receive at least one PDCCH scheduling a PDSCH for receiving the plurality of RARs.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
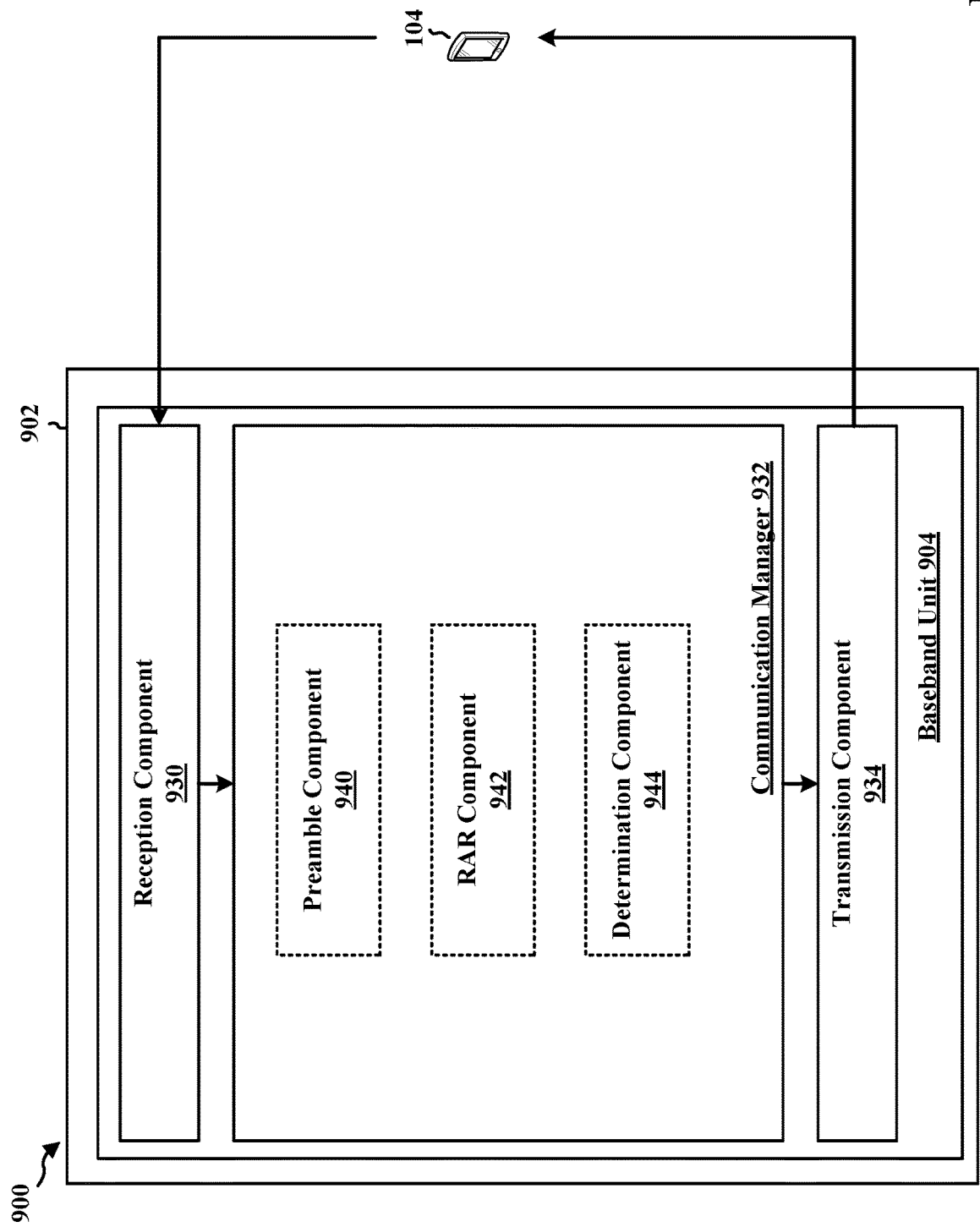
FIG. 9 is a diagram illustrating another example of a hardware implementation for another example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/ memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a preamble component 940 that is configured to receive, from a UE, a preamble to initiate a RACH procedure, e.g., as described in connection with 702. The communication manager 932 further includes a RAR component 942 that receives input in the form of the preamble from the preamble component 940 and is configured to transmit a first RAR to the UE in response to receiving the preamble, the first RAR being transmitted during a first portion of a RAR window, e.g., as described in connection with 704. The communication manager 932 further includes a determination component 944 that is configured to determine that a RRC connection request is not received in response to the transmitted first RAR, e.g., as described in connection with 706. The RAR component 942 receives input in the form of the determination from the determination component 944 and is further configured to transmit a first plurality of RARs to the UE in a first plurality of slots during a second portion of the RAR window subsequent to the first portion of the RAR window upon determining that the RRC connection request was not received in response to the transmitted first RAR, e.g., as described in connection with 708.

In one configuration, the determination component 944 is further configured to determine that a second RRC connection request is not received in response to the transmitted first plurality of RARs, and the RAR component 942 is further configured to transmit a second plurality of RARs to the UE in a second plurality of slots during a third portion of the RAR window subsequent to the second portion of the RAR window upon determining that the second RRC connection request was not received in response to the transmitted first plurality of RARs, where the second plurality of slots include a greater number of slots than the first plurality of slots.

In one configuration, the RAR component 942 is further configured to transmit at least one PDCCH scheduling PDSCHs for transmissions of the first plurality of RARs. In one configuration, the RAR component 942 is further configured to transmit a configuration indicating a hopping pattern for the transmission of the first plurality of RARs, the configuration being transmitted through one of DCI or system information, the first plurality of RARs being transmitted based on the transmitted configuration. In one configuration, the RAR component 942 is further configured to transmit a configuration indicating whether RAR repetition is configured, the configuration being transmitted through one of a MIB or system information, where the first plurality of RARs are transmitted based on the transmitted configuration. In one configuration, the RAR component 942 is further configured to transmit a configuration indicating at least one of a partition of the RAR window for RAR repetitions, a segment within the RAR window for the RAR repetitions, or a number of RAR repetitions for each RAR window partition or segment, the configuration being transmitted through one of a MIB, system information, or an RRC message, where the first plurality of RARs are transmitted based on the transmitted configuration.

The apparatus may include additional components that perform each of the blocks of the algorithm in the aforementioned flowcharts of FIGS. 4 and 7. As such, each block in the aforementioned flowcharts of FIGS. 4 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a preamble to initiate a RACH procedure; and means for transmitting a first RAR to the UE in response to receiving the preamble, the first RAR being transmitted during a first portion of a RAR window. The apparatus 902, and in particular the baseband unit 904, further includes means for determining that a RRC connection request is not received in response to the transmitted first RAR; and the means for transmitting is further configured to transmit a first plurality of RARs to the UE in a first plurality of slots during a second portion of the RAR window subsequent to the first portion of the RAR window upon determining that the RRC connection request was not received in response to the transmitted first RAR. In one configuration, the means for determining is further configured to determine that a second RRC connection request is not received in response to the transmitted first plurality of RARs; and the means for transmitting is further configured to transmit a second plurality of RARs to the UE in a second plurality of slots during a third portion of the RAR window subsequent to the second portion of the RAR window upon determining that the second RRC connection request was not received in response to the transmitted first plurality of RARs, where the second plurality of slots include a greater number of slots than the first plurality of slots. In one configuration, the means for transmitting is further configured to transmit at least one PDCCH scheduling PDSCHs for transmissions of the first plurality of RARs.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4, 5A, 5B, as discussed above, the UE 402 may not receive the msg2 RAR 408 due to high path loss and the relatively wider beam (rather than a narrow beam) carrying the msg2 RAR 408. In order to improve the reception of the msg2 RAR, then within portion 540 of a RAR window 526, the BS 404 may transmit the msg2 RAR with PDSCH repetition, such as the plurality of RARs 412 within a plurality of slots (e.g., slots 2m+1, 2m+2). The msg2 PDSCHs may be scheduled by one or more msg2 PDCCHs. If more than one msg2 PDCCH is used (such as shown in FIG. 5A), then the msg2 PDCCH is also configured with repetition. If the UE 402 is unable to receive properly the plurality of RARs 412, then within portion 550 of a RAR window 526, the BS 404 may transmit the msg2 RAR with a greater PDSCH repetition, such as the second plurality of RARs 418 within a second plurality of slots (e.g., slots 2n+1, 2n+2, 2n+3, 2n+4). The transmission/reception of msg2 RAR PDSCHs with repetition improves the performance of the RACH procedure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication of a device at a user equipment (UE), comprising: transmitting, to a base station, a preamble to initiate a random access channel (RACH) procedure; and receiving, from the base station, a plurality of random access responses (RARs) in response to the transmitted preamble, the plurality of RARs being received in a plurality of slots during a portion of a RAR window.

Example 2 is the method of Example 1, further comprising determining that a first RAR in response to the preamble is unsuccessfully received, wherein the plurality of RARs are received based on the first RAR being unsuccessfully received.

Example 3 is the method of Examples 1 or 2, further comprising: combining the received RARs into one RAR; decoding the one RAR; and transmitting, to the base station, a radio resource control (RRC) connection request in response to the one RAR.

Example 4 is the method of Examples 1 or 2, further comprising: decoding unsuccessfully the plurality of RARs; and receiving, from the base station, a second plurality of RARs in a second plurality of slots, the second plurality of RARs being received based on the plurality of RARs being unsuccessfully received, wherein the second plurality of slots include a greater number of slots than the plurality of slots.

Example 5 is the method of any of Examples 1 to 4, further comprising receiving at least one physical downlink control channel (PDCCH) scheduling a physical downlink shared channel (PDSCH) for receiving the plurality of RARs.

Example 6 is the method of Example 5, wherein the at least one PDCCH is received during a first configured segment of the RAR window, and the plurality of RARs are received during a second configured segment of the RAR window subsequent to the first configured segment of the RAR window.

Example 7 is the method of Example 5, wherein the at least one PDCCH is received during a first configured segment of the RAR window, and the plurality of RARs are received during the first configured segment of the RAR window.

Example 8 is the method of any of Examples 1 to 7, further comprising receiving a configuration indicating a hopping pattern for receiving the plurality of RARs, the configuration being received through one of downlink control information (DCI) or system information, the plurality of RARs being received based on the received configuration.

Example 9 is the method of any of Examples 1 to 8, further comprising receiving a configuration indicating whether RAR repetition is configured, the configuration being received through one of a master information block (MIB) or system information, wherein the plurality of RARs are received based on the received configuration.

Example 10 is the method of any of Examples 1 to 9, further comprising receiving a configuration indicating at least one of a partition of the RAR window for RAR repetitions, a segment within the RAR window for the RAR repetitions, or a number of RAR repetitions for each RAR window partition or segment, the configuration being received through one of a master information block (MIB), system information, or a radio resource control (RRC) message, wherein the plurality of RARs are received based on the received configuration.

Example 11 is an apparatus for wireless communication, the apparatus being a device at a user equipment (UE), comprising: a memory; and at least one processor coupled to the memory and configured to: transmit, to a base station, a preamble to initiate a random access channel (RACH) procedure; and receive, from the base station, a plurality of random access responses (RARs) in response to the transmitted preamble, the plurality of RARs being received in a plurality of slots during a portion of a RAR window.

Example 12 is the apparatus of Example 11, wherein the at least one processor is further configured to determine that a first RAR in response to the preamble is unsuccessfully received, wherein the plurality of RARs are received based on the first RAR being unsuccessfully received.

Example 13 is the apparatus of Example 11 or 12, wherein the at least one processor is further configured to: combine the received RARs into one RAR; decode the one RAR; and transmit, to the base station, a radio resource control (RRC) connection request in response to the one RAR.

Example 14 is the apparatus of Example 11 or 12, wherein the at least one processor is further configured to: decode unsuccessfully the plurality of RARs; and receive, from the base station, a second plurality of RARs in a second plurality of slots, the second plurality of RARs being received based on the plurality of RARs being unsuccessfully received, wherein the second plurality of slots include a greater number of slots than the plurality of slots.

Example 15 is the apparatus of any of Examples 11 to 14, wherein the at least one processor is further configured to receive at least one physical downlink control channel (PDCCH) scheduling a physical downlink shared channel (PDSCH) for receiving the plurality of RARs.

Example 16 is the apparatus of Example 15, wherein the at least one PDCCH is received during a first configured segment of the RAR window, and the plurality of RARs are received during a second configured segment of the RAR window subsequent to the first configured segment of the RAR window.

Example 17 is the apparatus of Example 15, wherein the at least one PDCCH is received during a first configured segment of the RAR window, and the plurality of RARs are received during the first configured segment of the RAR window.

Example 18 is a method of wireless communication of a device at a base station (BS), comprising: receiving, from a user equipment (UE), a preamble to initiate a random access channel (RACH) procedure; transmitting a first random access response (RAR) to the UE in response to receiving the preamble, the first RAR being transmitted during a first portion of a RAR window; determining that a radio resource control (RRC) connection request is not received in response to the transmitted first RAR; and transmitting a first plurality of RARs to the UE in a first plurality of slots during a second portion of the RAR window subsequent to the first portion of the RAR window upon determining that the RRC connection request was not received in response to the transmitted first RAR.

Example 19 is the method of Example 18, further comprising: determining that a second RRC connection request is not received in response to the transmitted first plurality of RARs; and transmitting a second plurality of RARs to the UE in a second plurality of slots during a third portion of the RAR window subsequent to the second portion of the RAR window upon determining that the second RRC connection request was not received in response to the transmitted first plurality of RARs, wherein the second plurality of slots include a greater number of slots than the first plurality of slots.

Example 20 is the method of Example 18 or 19, further comprising transmitting at least one physical downlink control channel (PDCCH) scheduling physical downlink shared channels (PDSCHs) for transmissions of the first plurality of RARs.

Example 21 is the method of Example 20, wherein the at least one PDCCH is transmitted during a first configured segment of the RAR window, and the first plurality of RARs are transmitted during a second configured segment of the RAR window subsequent to the first configured segment of the RAR window.

Example 22 is the method of Example 20, wherein the at least one PDCCH is transmitted during a first configured segment of the RAR window, and the first plurality of RARs are transmitted during the first configured segment of the RAR window.

Example 23 is the method of any of Examples 18 to 22, further comprising transmitting a configuration indicating a hopping pattern for the transmission of the first plurality of RARs, the configuration being transmitted through one of downlink control information (DCI) or system information, the first plurality of RARs being transmitted based on the transmitted configuration.

Example 24 is the method of any of Examples 18 to 23, further comprising transmitting a configuration indicating whether RAR repetition is configured, the configuration being transmitted through one of a master information block (MIB) or system information, wherein the first plurality of RARs are transmitted based on the transmitted configuration.

Example 25 is the method of any of Examples 18 to 24, further comprising transmitting a configuration indicating at least one of a partition of the RAR window for RAR repetitions, a segment within the RAR window for the RAR repetitions, or a number of RAR repetitions for each RAR window partition or segment, the configuration being transmitted through one of a master information block (MIB), system information, or an RRC message, wherein the first plurality of RARs are transmitted based on the transmitted configuration.

Example 26 is an apparatus for wireless communication, the apparatus being a device at a base station (BS), comprising: a memory; and at least one processor coupled to the memory and configured to: receive, from a user equipment (UE), a preamble to initiate a random access channel (RACH) procedure; transmit a first random access response (RAR) to the UE in response to receiving the preamble, the first RAR being transmitted during a first portion of a RAR window; determine that a radio resource control (RRC) connection request is not received in response to the transmitted first RAR; and transmit a first plurality of RARs to the UE in a first plurality of slots during a second portion of the RAR window subsequent to the first portion of the RAR window upon determining that the RRC connection request was not received in response to the transmitted first RAR.

Example 27 is the apparatus of Example 26, wherein the at least one processor is further configured to: determine that a second RRC connection request is not received in response to the transmitted first plurality of RARs; and transmit a second plurality of RARs to the UE in a second plurality of slots during a third portion of the RAR window subsequent to the second portion of the RAR window upon determining that the second RRC connection request was not received in response to the transmitted first plurality of RARs, wherein the second plurality of slots include a greater number of slots than the first plurality of slots.

Example 28 is the apparatus of Example 26 or 27, wherein the at least one processor is further configured to transmit at least one physical downlink control channel (PDCCH) scheduling physical downlink shared channels (PDSCHs) for transmissions of the first plurality of RARs.

Example 29 is the apparatus of Example 28, wherein the at least one PDCCH is transmitted during a first configured segment of the RAR window, and the first plurality of RARs are transmitted during a second configured segment of the RAR window subsequent to the first configured segment of the RAR window.

Example 30 is the apparatus of Example 28, wherein the at least one PDCCH is transmitted during a first configured segment of the RAR window, and the first plurality of RARs are transmitted during the first configured segment of the RAR window.

What is claimed is:

1. A method of wireless communication of a device at a user equipment (UE), the method comprising:
   receiving, from a base station, a first repetition configuration associated with a first portion of a random access response (RAR) window and a second repetition configuration associated with a second portion of the RAR window different than the first portion of the RAR window, the first repetition configuration and the second repetition configuration indicating a different number of RAR repetitions configured between the first portion of the RAR window and the second portion of the RAR window;
   transmitting, to the base station, a preamble to initiate a random access channel (RACH) procedure;
   determining that a first RAR is received unsuccessfully after transmission of the preamble;
   receiving, from the base station, a first plurality of RARs in a first plurality of slots during the first portion of the RAR window based on the first repetition configuration;
   determining whether the first plurality of RARs is received unsuccessfully; and
   receiving, from the base station, a second plurality of RARs in a second plurality of slots during the second portion of the RAR window based on the second repetition configuration when the first plurality of RARs is received unsuccessfully.

2. The method of claim 1, further comprising:
combining the first plurality of RARs into a combined RAR;
decoding the combined RAR; and
transmitting, to the base station, a radio resource control (RRC) connection request in response to the combined RAR.

3. The method of claim 1, wherein the determining whether the first plurality of RARs is received unsuccessfully comprises decoding unsuccessfully the first plurality of RARs, wherein the second plurality of slots include a greater number of slots than the first plurality of slots.

4. The method of claim 1, further comprising receiving at least one physical downlink control channel (PDCCH) scheduling a physical downlink shared channel (PDSCH) for receiving the first plurality of RARs.

5. The method of claim 4, wherein the at least one PDCCH is received during a first configured segment of the RAR window, and the first plurality of RARs are received during a second configured segment of the RAR window subsequent to the first configured segment of the RAR window.

6. The method of claim 4, wherein the at least one PDCCH is received during a first configured segment of the RAR window, and the first plurality of RARs are received during the first configured segment of the RAR window.

7. The method of claim 1, further comprising receiving a configuration indicating a hopping pattern for receiving the first plurality of RARs, the configuration being received through one of downlink control information (DCI) or system information, the first plurality of RARs being received based on the received configuration.

8. The method of claim 1, further comprising receiving a configuration indicating whether RAR repetition is configured, the configuration being received through one of a master information block (MIB) or system information, wherein the first plurality of RARs is received based on the received configuration.

9. The method of claim 1, further comprising receiving a configuration indicating at least one of a partition of the RAR window for RAR repetitions, a segment within the RAR window for the RAR repetitions, or a number of RAR repetitions for each RAR window partition or segment, the configuration being received through one of a master information block (MIB), system information, or a radio resource control (RRC) message, wherein the first plurality of RARs is received based on the received configuration.

10. An apparatus for wireless communication, the apparatus being a device at a user equipment (UE), the apparatus comprising:
a memory; and
at least one processor coupled to the memory and configured to:
receive, from a base station, a first repetition configuration associated with a first portion of a random access response (RAR) window and a second repetition configuration associated with a second portion of the RAR window different than the first portion of the RAR window, the first repetition configuration and the second repetition configuration indicating a different number of RAR repetitions configured between the first portion of the RAR window and the second portion of the RAR window;
transmit, to the base station, a preamble to initiate a random access channel (RACH) procedure;
determine that a first RAR is received unsuccessfully after transmission of the preamble;
receive, from the base station, a plurality of RARs in a first plurality of slots during the first portion of the RAR window based on the first repetition configuration;
determine whether the first plurality of RARs is received unsuccessfully; and
receive, from the base station, a second plurality of RARs in a second plurality of slots during the second portion of the RAR window based on the second repetition configuration when the first plurality of RARs is received unsuccessfully.

11. The apparatus of claim 10, wherein the at least one processor is further configured to:
combine the first plurality of RARs into a combined RAR;
decode the combined RAR; and
transmit, to the base station, a radio resource control (RRC) connection request in response to the combined RAR.

12. The apparatus of claim 10, wherein the at least one processor configured to determine that the first RAR is received unsuccessfully includes to decode unsuccessfully the first plurality of RARs, wherein the second plurality of slots include a greater number of slots than the first plurality of slots.

13. The apparatus of claim 10, wherein the at least one processor is further configured to receive at least one physical downlink control channel (PDCCH) scheduling a physical downlink shared channel (PDSCH) for receiving the first plurality of RARs.

14. The apparatus of claim 13, wherein the at least one PDCCH is received during a first configured segment of the RAR window, and the first plurality of RARs are received during a second configured segment of the RAR window subsequent to the first configured segment of the RAR window.

15. The apparatus of claim 13, wherein the at least one PDCCH is received during a first configured segment of the RAR window, and the first plurality of RARs are received during the first configured segment of the RAR window.

16. A method of wireless communication of a device at a base station (BS), the method comprising:
transmitting, to a user equipment (UE), a first repetition configuration associated with a first portion of a random access response (RAR) window and a second repetition configuration associated with a second portion of the RAR window different than the first portion of the RAR window, the first repetition configuration and the second repetition configuration indicating a different number of RAR repetitions configured between the first portion of the RAR window and the second portion of the RAR window;
receiving, from the UE, a preamble to initiate a random access channel (RACH) procedure;
transmitting a first RAR to the UE in response to receiving the preamble, the first RAR being transmitted during a third portion of the RAR window;
determining that a radio resource control (RRC) connection request is not received in response to the transmitted first RAR;
transmitting a first plurality of RARs to the UE based on the first repetition configuration, the first plurality of RARs being transmitted in a first plurality of slots during the first portion of the RAR window subsequent to the third portion of the RAR window upon the determining that the RRC connection request is not received in response to the transmitted first RAR;

determining that a second RRC connection request is not received in response to the transmitted first plurality of RARs; and transmitting, to the UE, a second plurality of RARs in a second plurality of slots during the second portion of the RAR window based on the second repetition configuration.

17. The method of claim 16, wherein the second plurality of slots include a greater number of slots than the first plurality of slots.

18. The method of claim 16, further comprising transmitting at least one physical downlink control channel (PDCCH) scheduling physical downlink shared channels (PDSCHs) for transmissions of the first plurality of RARs.

19. The method of claim 18, wherein the at least one PDCCH is transmitted during a first configured segment of the RAR window, and the first plurality of RARs is transmitted during a second configured segment of the RAR window subsequent to the first configured segment of the RAR window.

20. The method of claim 18, wherein the at least one PDCCH is transmitted during a first configured segment of the RAR window, and the first plurality of RARs is transmitted during the first configured segment of the RAR window.

21. The method of claim 16, further comprising transmitting a configuration indicating a hopping pattern for the transmitting of the first plurality of RARs, the configuration being transmitted through one of downlink control information (DCI) or system information, the first plurality of RARs being transmitted based on the transmitted configuration.

22. The method of claim 16, further comprising transmitting a configuration indicating whether RAR repetition is configured, the configuration being transmitted through one of a master information block (MIB) or system information, wherein the first plurality of RARs is transmitted based on the transmitted configuration.

23. The method of claim 16, further comprising transmitting a configuration indicating at least one of a partition of the RAR window for RAR repetitions, a segment within the RAR window for the RAR repetitions, or a number of RAR repetitions for each RAR window partition or segment, the configuration being transmitted through one of a master information block (MIB), system information, or an RRC message, wherein the first plurality of RARs are transmitted based on the transmitted configuration.

24. An apparatus for wireless communication, the apparatus being a device at a base station (BS), the apparatus comprising:

a memory; and
at least one processor coupled to the memory and configured to:
transmit, to a user equipment (UE), a first repetition configuration associated with a first portion of a random access response (RAR) window and a second repetition configuration associated with a second portion of the RAR window different than the first portion of the RAR window, the first repetition configuration and the second repetition configuration indicating a different number of RAR repetitions configured between the first portion of the RAR window and the second portion of the RAR window;
receive, from the UE, a preamble to initiate a random access channel (RACH) procedure;
transmit a first RAR to the UE in response to receiving the preamble, the first RAR being transmitted during a third portion of the RAR window;
determine that a radio resource control (RRC) connection request is not received in response to the transmitted first RAR;
transmit a first plurality of RARs to the UE based on the first repetition configuration, the first plurality of RARs being transmitted in a first plurality of slots during the first portion of the RAR window subsequent to the third portion of the RAR window upon the determining that the RRC connection request is not received in response to the transmitted first RAR;
determine that a second RRC connection request is not received in response to the transmitted first plurality of RARs; and
transmit, to the UE, a second plurality of RARs in a second plurality of slots during the second portion of the RAR window based on the second repetition configuration.

25. The apparatus of claim 24, wherein the second plurality of slots include a greater number of slots than the first plurality of slots.

26. The apparatus of claim 24, wherein the at least one processor is further configured to transmit at least one physical downlink control channel (PDCCH) scheduling physical downlink shared channels (PDSCHs) for transmissions of the first plurality of RARs.

27. The apparatus of claim 26, wherein the at least one PDCCH is transmitted during a first configured segment of the RAR window, and the first plurality of RARs is transmitted during a second configured segment of the RAR window subsequent to the first configured segment of the RAR window.

28. The apparatus of claim 26, wherein the at least one PDCCH is transmitted during a first configured segment of the RAR window, and the first plurality of RARs is transmitted during the first configured segment of the RAR window.

* * * * *